US005478531A

United States Patent [19]
Yoshikawa

[11] Patent Number: 5,478,531
[45] Date of Patent: Dec. 26, 1995

[54] MUFFLING AND DENITRATING APPARATUS

[75] Inventor: Hideo Yoshikawa, Yachiyo, Japan

[73] Assignee: Ajiawasu Kabushiki Kaisha, Tokyo, Japan; a part interest

[21] Appl. No.: 149,995

[22] Filed: Nov. 10, 1993

[30] Foreign Application Priority Data

| Apr. 28, 1993 | [JP] | Japan | 5-125021 |
| Jun. 2, 1993 | [JP] | Japan | 5-156160 |
| Sep. 21, 1993 | [JP] | Japan | 5-257833 |

[51] Int. Cl.⁶ ............................................. F01N 3/00
[52] U.S. Cl. ............... 422/177; 422/174; 422/177; 422/199; 422/211; 422/219; 60/299; 423/212; 423/213.7; 423/447.7; 502/432; 95/70; 96/55
[58] Field of Search ............... 422/171, 174, 422/176, 177, 180, 211, 219, 222, 220, 199; 95/70; 96/55; 423/447.7, 212, 213.2; 502/432; 60/299

[56] References Cited

U.S. PATENT DOCUMENTS

| 2,770,318 | 11/1956 | Triggs | 422/175 |
| 2,772,147 | 11/1956 | Bowen III et al. | 422/177 |
| 3,043,096 | 7/1962 | McLoughlin | 422/174 |
| 3,083,084 | 3/1963 | Raymond | 422/177 |
| 4,056,934 | 11/1977 | Mizusawa et al. | 55/DIG. 30 |
| 4,086,063 | 4/1978 | Garcea | 60/299 |
| 4,355,504 | 10/1982 | Liu et al. | 55/DIG. 30 |
| 5,064,581 | 11/1991 | Krupp et al. | 423/447.7 |
| 5,217,511 | 6/1993 | Plaks et al. | 96/55 |
| 5,282,885 | 2/1994 | Cameron | 96/55 |

Primary Examiner—Robert J. Warden
Assistant Examiner—Hien Tran
Attorney, Agent, or Firm—Steinberg, Raskin & Davidson

[57] ABSTRACT

A muffling and denitrating apparatus capable of lowering a level of noise generated by a combustion engine and reducing a concentration of NOx in exhaust gas of the engine. Sound-damping and denitration are accomplished by a carbon fiber or particle layer arranged in the apparatus. Exhaust sound is adsorbed by carbon fibers or carbon particles, resulting in a sound pressure thereof being reduced. NOx is converted into $N_2$ and $CO_2$, to thereby be decreased in concentration. Carbon fibers and/or carbon particles for the carbon fiber or particle layer are preferably treated or modified with nitrogen monoxide gas or a nitric acid solution, resulting in having an increased surface area as large as 80 to 2000 $m^2/g$.

11 Claims, 8 Drawing Sheets

MUFFLING AND DENITRATING APPARATUS

BACKGROUND OF THE INVENTION

This invention relates to a muffling and denitrating apparatus for reducing exhaust sound generated by a combustion engine and concurrently reducing a concentration of nitrogen oxides contained in exhaust gas of the engine. Also, the present invention relates to a muffling and denitrating apparatus equipped with a dust collecting mechanism for removing particulates from the exhaust gas. Further, the present invention relates to modified carbon fibers or carbon particles used for the muffling and denitrating apparatus and a process for producing the same.

In various kinds of combustion engines including, particularly, a moving combustion engine such as an automobile or the like, sound-damping or a decrease in noise attendant upon generation and discharge of exhaust gas from the combustion engine and denitration or a decrease in concentration of nitrogen oxides ($NO_x$) in the exhaust gas are highly desirable.

A conventional muffler for an automobile is provided therein with a plurality of rectifying plates for sound-damping. Unfortunately, such arrangement of the rectifying plates causes a back pressure to be increased, resulting in combustion efficiency of an automobile being substantially decreased, so that fuel consumption efficiency is deteriorated.

One of denitrating devices which have been conventionally known in the art uses a noble metal catalyst made of noble metal such as platinum or the like. Unfortunately, platinum is highly expensive and readily poisoned by impurities contained in exhaust gas of a combustion engine, resulting in catalytic performance of the catalyst being deteriorated. In particular, this leads to a failure in application of the catalyst to a diesel engine. Also, there is known denitration using carbon fibers, as taught in Proceedings of the 69th National Convention Lecture of Japan Society of Mechanical Engineers, "1508 Research of Denitrating Apparatus by New Material", pp 450–452. However, the denitration still requires improvements such as an improvement in denitrating performance of the material, an improvement in the denitrating apparatus, and the like.

A conventional engine for an automobile generally employs a denitrating device using a catalyst which is rendered active at an elevated temperature. The denitrating device is installed at a high temperature site in proximity to an outlet of the engine. Also, the engine is provided with a muffling device, which is located at a position of a reduced temperature on a downstream side in a direction of flow of exhaust gas based on the denitrating device. Thus, the muffling device and denitrating device are arranged separate from each other, to thereby cause complication of an exhaust system of the automobile and an increase in manufacturing cost of the exhaust system.

In addition, it is known that particulates, such as soot, contained in exhaust gas of a combustion engine causes air pollution, therefore, removal of the particulates as well as the above-described sound-damping and denitration is highly desired.

SUMMARY OF THE INVENTION

The present invention has been made in view of the foregoing disadvantages of the prior art.

Accordingly, it is an object of the present invention to provide a muffling and denitration apparatus which is capable of concurrently accomplishing sound-damping and denitration of exhaust gas generated from a combustion engine.

It is another object of the present invention to provide a muffling and denitrating apparatus equipped with a dust collecting mechanism which is capable of accomplishing removal of particulates contained in exhaust gas of a combustion engine by suction as well as sound-damping and denitration thereof.

It is a further object of the present invention to provide modified carbon fibers or carbon particles used for the above-described muffling and denitrating apparatus.

It is still another object of the present invention to provide a process for preparing modified carbon fibers or carbon particles used for the above-described muffling and denitrating apparatus.

In accordance with one aspect of the present invention, a muffling and denitrating apparatus is provided. The apparatus comprises a body formed of a hollow vessel and provided with a plurality of exhaust pipe connection ports, a muffling and denitrating section including a cover member made of a perforated material and arranged in the body in a manner to be positioned at a portion of the body other than a lower portion thereof and a carbon fiber or particle layer held in the cover member, a soot reservoir section arranged in the body in a manner to be positioned at the lower portion of the body and provided with a heating means, and at least one rectifying plate formed with a plurality of through-holes via which exhaust gas pipes are inserted and arranged in the body so as to divide a space defined in the body by cooperation between the muffling and denitrating section and the soot reservoir section into space sections.

In a preferred embodiment of the present invention, the apparatus may further comprise at least one carbon particle feed section.

In a preferred embodiment of the present invention, the apparatus further comprise a dust collecting mechanism arranged in an exhaust gas discharge path. The dust collecting mechanism includes an electrifying mesh section made of a conductive perforated material and electrically connected to a negative electrode of a DC power supply and a dust collecting filter section arranged on a downstream side in the exhaust gas discharge path based on the electrifying mesh section and including a carbon fiber or particle layer connected to a positive electrode of the DC power supply.

In a preferred embodiment of the present invention, modified carbon fibers or carbon particles for the carbon fiber or particle layer are formed into an average surface area of 80 to 2000$m^2$/g.

In accordance with another aspect of the present invention, there is provided a method for preparing the above-described modified carbon fibers or carbon particles, wherein the carbon fibers or carbon particles are contacted with nitrogen monoxide gas or a nitric acid solution.

In the muffling and denitrating apparatus of the present invention constructed as described above, exhaust sound generated by a combustion engine is decreased in sound pressure thereof through the carbon fiber or particle layer incorporated in the apparatus. NOx contained in exhaust gas of the engine is contacted with the carbon fiber or particle layer, to thereby be decreased in concentration thereof through a series of reactions indicated by the following expressions:

wherein C indicates carbon fibers or carbon particles and (C—O) indicates an intermediate product which is an active group.

The carbon fibers or carbon particles modified with nitrogen monoxide or a nitric acid solution are rendered porous, to thereby be highly increased in surface area with which NOx is contacted.

The muffling and denitrating apparatus of the present invention may be applied to various kinds of combustion engines. In particular, it is suitably applied to a moving combustion engine. Optimizedly, it is applied to a diesel engine.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, the present invention will be described hereinafter with reference to the accompanying drawings.

Figure 1:
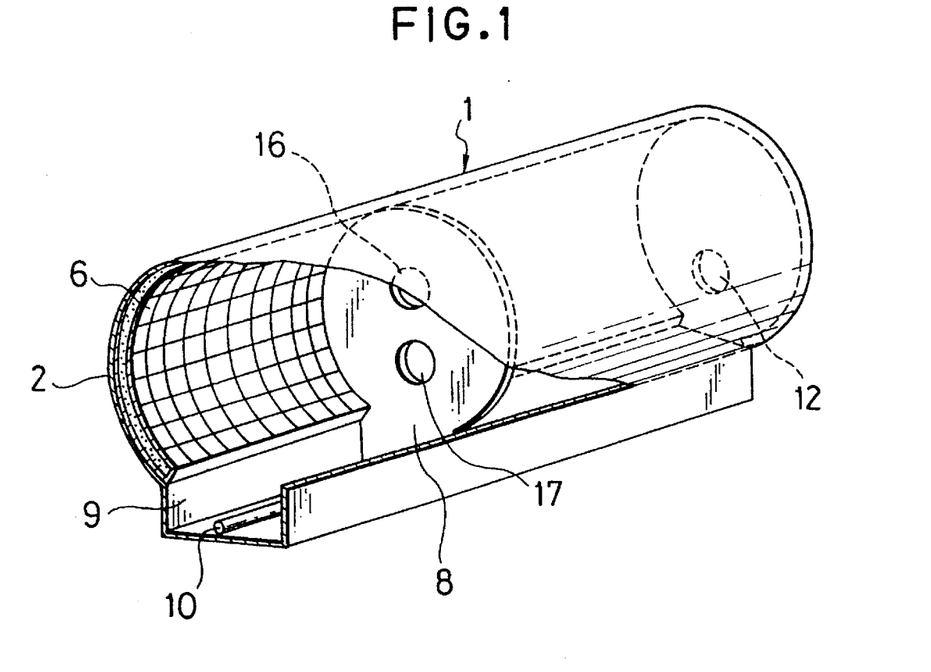
FIG. 1 is a partially cutaway perspective view showing an embodiment of a muffling and denitrating apparatus according to the present invention.
Figure 2:
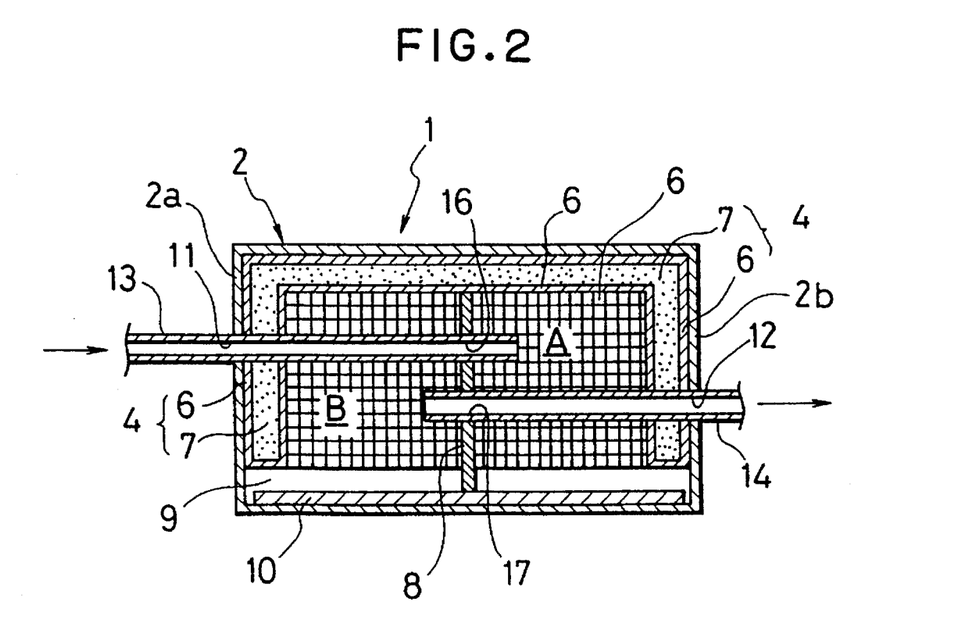
FIG. 2 is a longitudinal sectional view of the muffling and denitrating apparatus shown in FIG. 1 which is taken in a longitudinal or axial direction of the apparatus.
Figure 3:
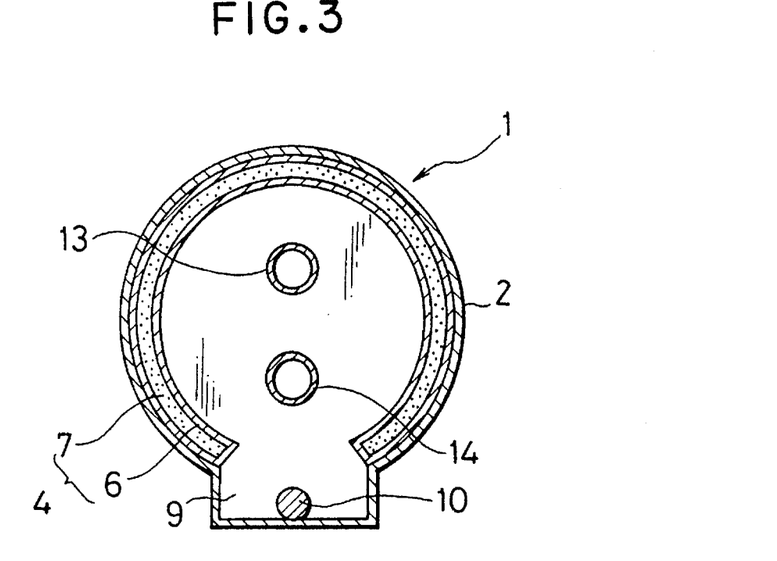
FIG. 3 is a transverse sectional view of the muffling and denitrating apparatus shown in FIG. 1 which is taken in a direction perpendicular to a diametric direction of the muffling and denitrating apparatus.

Referring first to FIGS. 1 to 3, a first embodiment of a muffling and denitrating apparatus according to the present invention is illustrated. A muffling and denitrating apparatus of the illustrated embodiment generally designated at reference numeral 1 includes a body 2 in the form of a hollow vessel of a substantially cylindrical shape and a muffling and denitrating section 4 fittedly arranged in the body 2 in a manner to intimately contacted with an inner surface of the body 2. The body 2 is provided at both ends 2a and 2b thereof with exhaust pipe connection ports 11 and 12, respectively. The muffling add denitrating section 4 includes a cover member 6 and a layer 7 of carbon fibers or carbon particles held in the cover member 6. A lower portion of the body 2 which is away from the muffling and denitrating section 4 is provided therein with a soot reservoir section 9 in which a heating means is arranged. The muffling and denitrating section 4 and soot reservoir section 9 cooperate with each other to define a space in the body 2. In the space thus defined, a rectifying plate 8 is arranged so as act to flow exhaust gas along the carbon fiber or particle layer 7. More particularly, the rectifying plate 8 acts as a weir which divides the space into two space sections A and B and permits the exhaust gas to flow through the carbon fiber or particle layer 7 as much as possible. A plurality of such rectifying plates 8 may be arranged in the body 2. The rectifying plate 8 is formed with small holes (not shown), resulting in an increase in pressure loss which occurs when a small amount of exhaust gas flows being prevented. Also, the rectifying plate 8 is formed with through-holes 16 and 17, which are arranged in a manner to positionally correspond to the exhaust pipe connection ports 11 and 12 of the body 2, respectively.

The muffling and denitrating apparatus of the illustrated embodiment also includes an exhaust gas inlet pipe 13 and an exhaust gas outlet pipe 14. The exhaust gas inlet pipe 13 is inserted through the exhaust pipe connection port 11 into the body 2 and then via the through-hole 16 into the space portion A, resulting in communicating with the space section A. Thus, the exhaust gas inlet pipe 13 is arranged at one end thereof in the space section A and connected at the other end thereof to a combustion site, such as a combustion engine. The exhaust gas outlet pipe 14 is inserted through the exhaust pipe connection port 12 of the body 2 into the body 2 and then via the through-hole 17 into the space section B, to thereby communicate with the space section B. Thus, the exhaust gas outlet pipe 14 is arranged so as to communicate at one end thereof with the space section B and at the other end thereof with an ambient atmosphere.

A material for the body 2, a configuration thereof, a size thereof and the like are not subject to any specific limitations. Therefore, a muffler of an expansion chamber type which has been conventionally used in the art may be used for this purpose. Also, in the illustrated embodiment, one such exhaust gas inlet pipe 13 and one such exhaust gas outlet pipe 14 are inserted through one end 2a of the body 2 and the other end 2b thereof into the body 2, respectively. Alternatively, a plurality of such exhaust gas inlet pipes 13 and a plurality of such exhaust gas outlet pipes 14 may be provided. In this instance, the exhaust pipe connection ports 11 and 12 and rectifying plates 8 corresponding in number to the pipes 13 and 14 are provided.

The muffling and denitrating section 4 is arranged in a portion of the body 2 except a portion thereof at which the soot reservoir section 9 is positioned. The muffling and denitrating section 4 may be arranged so as to occupy a whole area of the portion of the body 2 or a part of the portion. The muffling and denitrating section 4 is preferably formed in a manner to be tightly contacted with the inner surface of the body 2 in order to ensure satisfactory thermal diffusion, however, it may be arranged in any other suitable manner. For example, it may be arranged through a suitable support means in the body 2 in a manner to be spaced from the inner surface of the body 2. Also, the muffling and denitrating section 4 may be formed into an outer configuration which permits an area of the section 4 contacted with exhaust gas to be significantly increased. For this purpose, the outer configuration may be formed into a corrugated shape or the like.

The cover member 6 may be made of a perforated material such as, for example, a wire net material, a punched metal material or the like. Perforations of the perforated material are not limited to any specific size so long as it permits exhaust gas to pass through the perforated material. However, the perforated material for the cover member 6 is preferably formed into a size of about 40 to 500 meshes in order to satisfactory support the carbon fiber or particle layer 7 thereon.

The layer 7 of carbon fibers or particles is so provided that the carbon fibers or particles are fully enveloped in the cover member 6, to thereby be positively held therein. The carbon fiber or particle layer 7 may be made of any one of carbon fibers and carbon particles. Alternatively, it may be made of a combination of the carbon fibers and carbon particles.

The carbon fibers may be made by forming a suitable material such as coal or petroleum pitch cellulose, polyacrylonitrile, lignin, resinous pitch or the like into fibers and modifying the fibers into an average surface area of 80 to $2000m^2/g$. The modified carbon fibers preferably have a diameter of 0.5 to 15 μm. The carbon fibers may be used in their original form. Alternatively, they may be used in the form of a woven fabric material such as a felt material, a mat material, a cloth material or the like. The carbon particles used may be formed by modifying mesocarbon micro-beads, activated charcoal, activated coke, milled fibers or the like into an average surface area of 80 to $2000m^2/g$. The carbon fibers are preferably formed into a substantially spherical shape having a particle diameter of about 0.01 to 2 mm.

The soot reservoir section 9 is provided at a portion of the body 2 other than a portion thereof at which the muffling and denitrating section 4 is arranged. More particularly, it is arranged in the body 2 in a manner to be positioned at a lower or bottom portion of the body 2 defined when the muffling and denitrating apparatus 1 is installed for the operation. The heating means 10 is electrically connected to an external power supply or a heat source (not shown).

Now, the manner of operation of the muffling and denitrating apparatus 1 of the illustrated embodiment will be described hereinafter with reference to FIG. 2.

When exhaust gas of a combustion engine is introduced through the exhaust gas inlet pipe 13 into the space sections A and B in the body 2, the rectifying plate 8 causes the exhaust gas to flow through the perforations of the cover member 6 into the carbon fiber or particle layer 7, resulting in the exhaust gas being contacted with the carbon fibers or carbon particles. Then, the exhaust gas is discharged through the exhaust gas outlet pipe 14 to an ambient atmosphere. During flowing of the exhaust gas in the muffling and denitrating apparatus 1, the exhaust gas is contacted with the carbon fiber or particle layer 7, so that the carbon fibers or particles in the layer 7 act to mainly lower a high-frequency sound pressure level of exhaust sound. Concurrently, the fibers or particles cause O of NO to react with a carbon atom to form an intermediate product (C—O), which is then adsorbed on the carbon fibers or particles. Also, N of NO is converted into $N_2$, which is then discharged to the ambient atmosphere together with the exhaust gas. Further, the intermediate product (C—O) adsorbed on the carbon fibers or particles is converted into $CO_2$ and a slight amount of CO due to a high temperature of the exhaust gas. Thus, the exhaust gas discharged to the ambient atmosphere mainly contains $N_2$, $CO_2$ and a slight amount of CO.

Soot generated due to a combustion operation of the combustion engine and contained in exhaust gas of the engine at least partially adheres to the carbon fiber or particle layer 7. Then, generation of vibration due to an increase in pressure in the body 2 or the like or forcible application of vibration from the outside to the layer 7 causes the soot to drop into the soot reservoir section 9, resulting in the soot being accumulated therein. The soot thus accumulated is then burned due to heating by the heating means 10 to form $CO_2$, which is then discharged through the exhaust gas outlet pipe 14 to the ambient atmosphere. Also, during the above-described sound-damping and denitration, the exhaust gas is forcibly passed through the muffling and denitrating section 4 to cause the carbon fiber or particle layer 7 to be cooled, resulting in the layer 7 being kept at a temperature sufficient to exhibit a satisfactory denitrating function or a temperature of about 550° C. or less.

Figure 4:
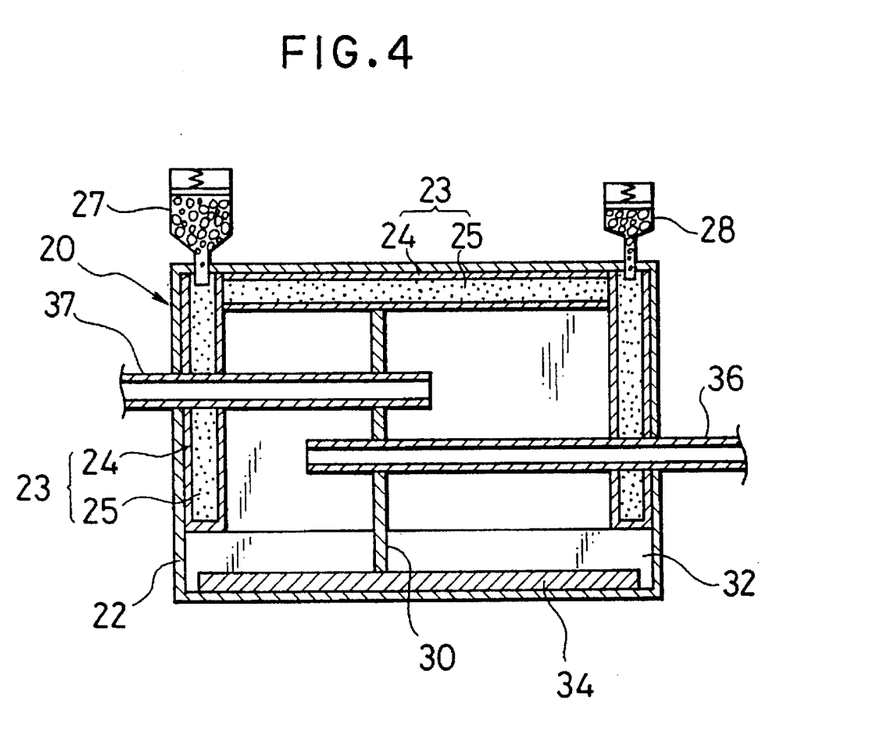
FIG. 4 is a longitudinal sectional view showing a modification of the muffling and denitrating apparatus of FIG. 1.
Figure 5:
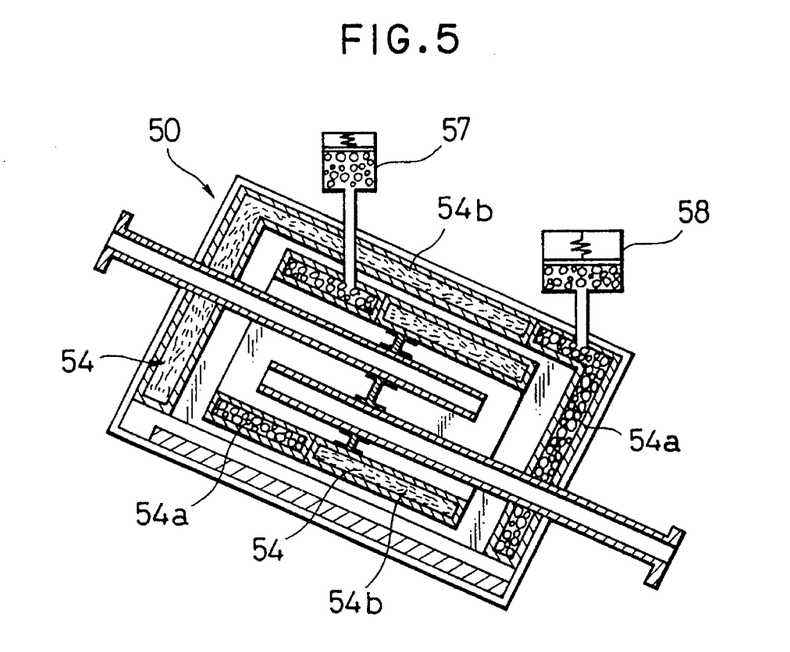
FIG. 5 is a longitudinal sectional view showing another modification of the muffling and denitrating apparatus of FIG. 1.

Referring now to each of FIGS. 4 and 5, a modification of the embodiment shown in FIGS. 1 to 3 is illustrated. A muffling and denitrating apparatus of the first modification which is generally designated as reference numeral 20 in FIG. 4 includes a body 22 of a hollow vessel and a muffling and denitrating section 23 which includes a cover member 24 and a carbon fiber or particle layer 25 held in the cover member 24. The muffling and denitrating section 23 is provided with carbon particle feed sections 27 and 28. The muffling and denitrating apparatus 20 further includes a rectifying plate 30, a soot reservoir section 32, heating means 34, an exhaust gas outlet pipe 36 and an exhaust gas inlet pipe 37. Also, a muffling and denitrating apparatus of the second modification generally designated at reference numeral 50 in FIG. 5 likewise includes a muffling and denitrating section 54 provided with carbon particle feed sections 57 and 58, which are obliquely arranged in order to further promote smooth feeding of carbon particles therefrom. Also, the muffling and denitrating section 54 is provided in an inner space of the muffling and denitrating apparatus 50 as well as on an inner surface thereof. The muffling and denitrating section 54 includes a carbon particle layer 54a and a carbon fiber layer 54b arranged adjacent to each other.

The muffling and denitrating apparatus shown in each of FIGS. 4 and 5 exhibits the same muffling and denitrating function as that shown in FIG. 1. However, the muffling and denitrating apparatus of each of FIGS. 4 and 5, when the amount of carbon particles is decreased due to consumption during denitration, permits carbon particles to be fed from the carbon particle feed sections through a suitable means such as elastic force, air pressure or the like, to thereby compensate the decrease.

The remaining part of each of the modifications may be constructed in substantially the same manner as the embodiment shown in FIGS. 1 to 3.

Test Example 1

A muffling and denitrating test took place using a muffling and denitrating apparatus of the present invention constructed in such a manner as shown in FIG. 2 and under conditions shown in Table 1. Also, a comparative test for sound-damping was carried out under substantially the same conditions except that no muffling and denitrating layer was arranged. A degree of denitration was obtained according to the following expression:

*Degree of Denitration* $(\%)=(A-B)/A\times 100$ wherein A is a concentration of NO at an inlet of the apparatus and B is a concentration of NO at an outlet of the apparatus. The results were as shown in Table 1.

Construction of Apparatus

Dimensions of body of apparatus: Diameter=200 mm, Length=300 mm.

Dimensions of exhaust pipe: Diameter=54 mm.

Muffling and denitrating section: Cover member: Wire net (60 meshes) Carbon fiber or particle layer: 300 g of a felt material made of pitch carbon fibers (diameter: 13 μm) immersed in 100% nitric acid for about 30 minutes and 350 g of activated carbon particles (particle diameter: 0.01 to 1 mm) immersed in 63.1% nitric acid for about 30 minutes (each average surface area: 400 m²/g).

Table 1

| | Muffling Test | | | |
|---|---|---|---|---|
| Engine Speed (rpm) | 1500 | 2000 | 2500 | 3000 |
| Output (ps) | 16.6 | 22.2 | 29.75 | 37.8 |
| Inlet Temperature (°C.) | 409 | 511 | 585 | 634 |
| Outlet Temperature (°C.) | 124 | 302 | 449 | 524 |
| Noise Level of Present Invention (dB) | 106.0 | 105.5 | 100.3 | 94.5 |
| Noise Level of Comparative Example (dB) | 108.5 | 112 | 102.5 | 97 |
| | Denitrating Test | | | |
| Inlet NO$_x$ Concentration (ppm) | 692 | 833 | 703 | 985 |
| Outlet NO$_x$ Concentration (ppm) | 203 | 313 | 256 | 364 |
| Degree of Denitration of Present Invention (%) | 70.7 | 62.4 | 63.5 | 63.0 |

Test Example 2

Figure 6:
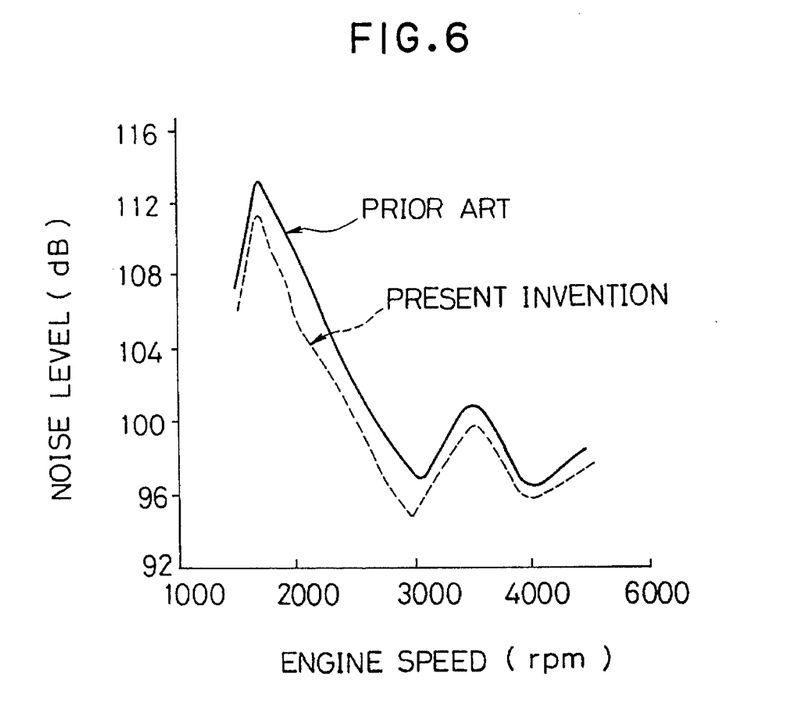
FIG. 6 is a graphical representation showing results of a sound-damping test carried out using each of a muffling and denitrating apparatus of the present invention and a prior art.

A conventional general-purpose muffler including an inlet pipe provided with a plurality of small holes for resonance and the muffling and denitrating apparatus of the present invention constructed into the above-described dimensions were used for a muffling test while varying an engine speed. The conventional general-purpose muffler includes three rectifying plates made of steel, to thereby reduce a pressure and decrease a flow rate of exhaust gas, resulting in lowering a noise level. The results were as shown in FIG. 6.

Test Example 3

Figure 7:
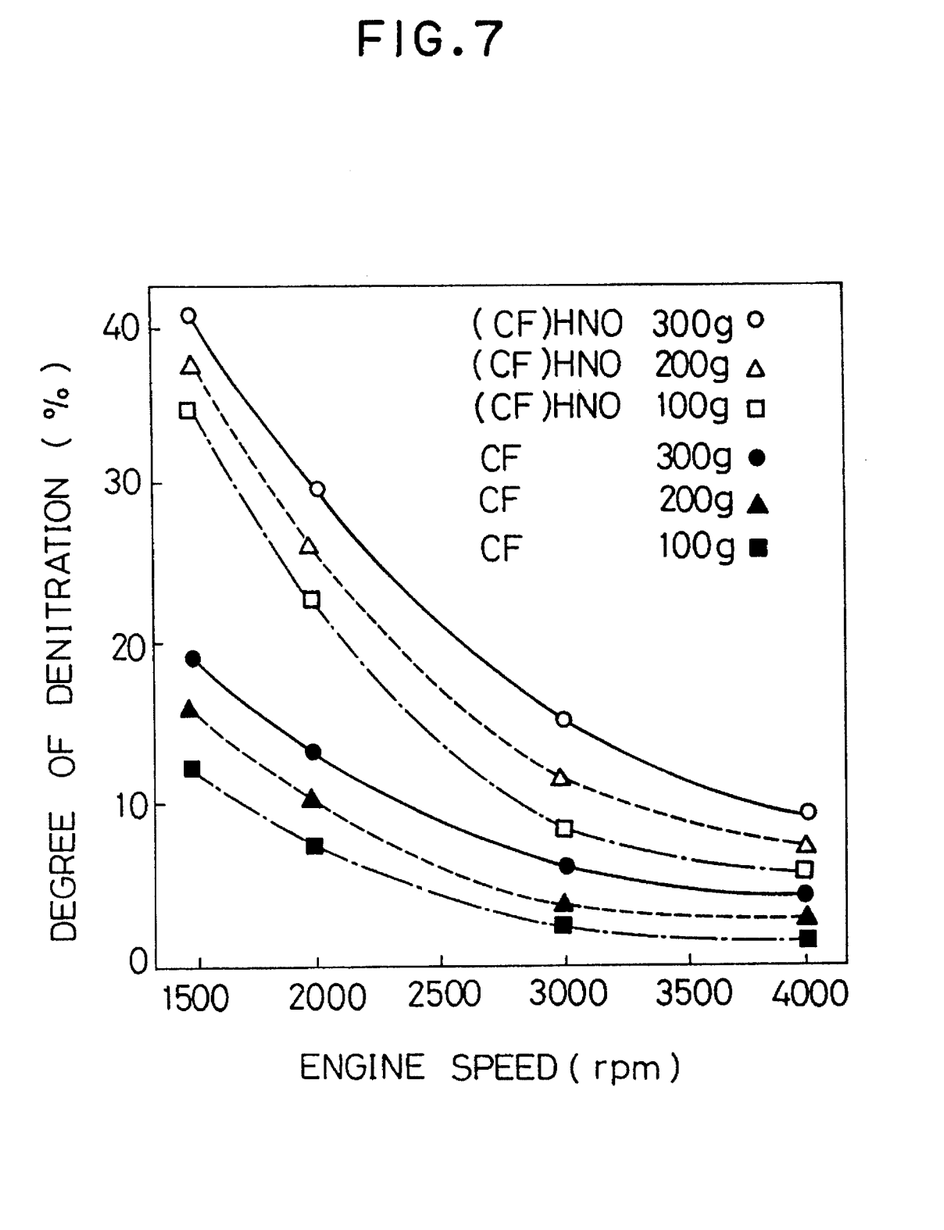
FIG. 7 is a graphical representation showing results of a denitrating test carried out using a muffling and denitrating apparatus according to the present invention.

Carbon fibers (calcination temperature: 900° to 950° C., surface area: 0.2 m²/g) made of coal pitch were used for a denitrating test using a muffling and denitrating apparatus of the present invention constructed in such a manner as shown in FIG. 2. The coal pitch carbon fibers were immersed in a nitric acid solution (62.1%) at a temperature of 25° C. for 2 hours and then washed with water, followed by drying at 65° C., resulting in being modified into an average surface area of 100 to 1500 m²/g. Also, a four-cylinder water-cooled gasoline engine (1177 ml) was used as a combustion engine. In the test, a degree of denitration was measured on each of modified carbon fibers and untreated carbon fibers in amounts of 100 g, 200 g and 300 g while varying an engine speed. The modified carbon fibers and untreated carbon fibers were indicated at (CF) and CF in FIG. 7, respectively. The results were as shown in FIG. 7.

Figure 8:
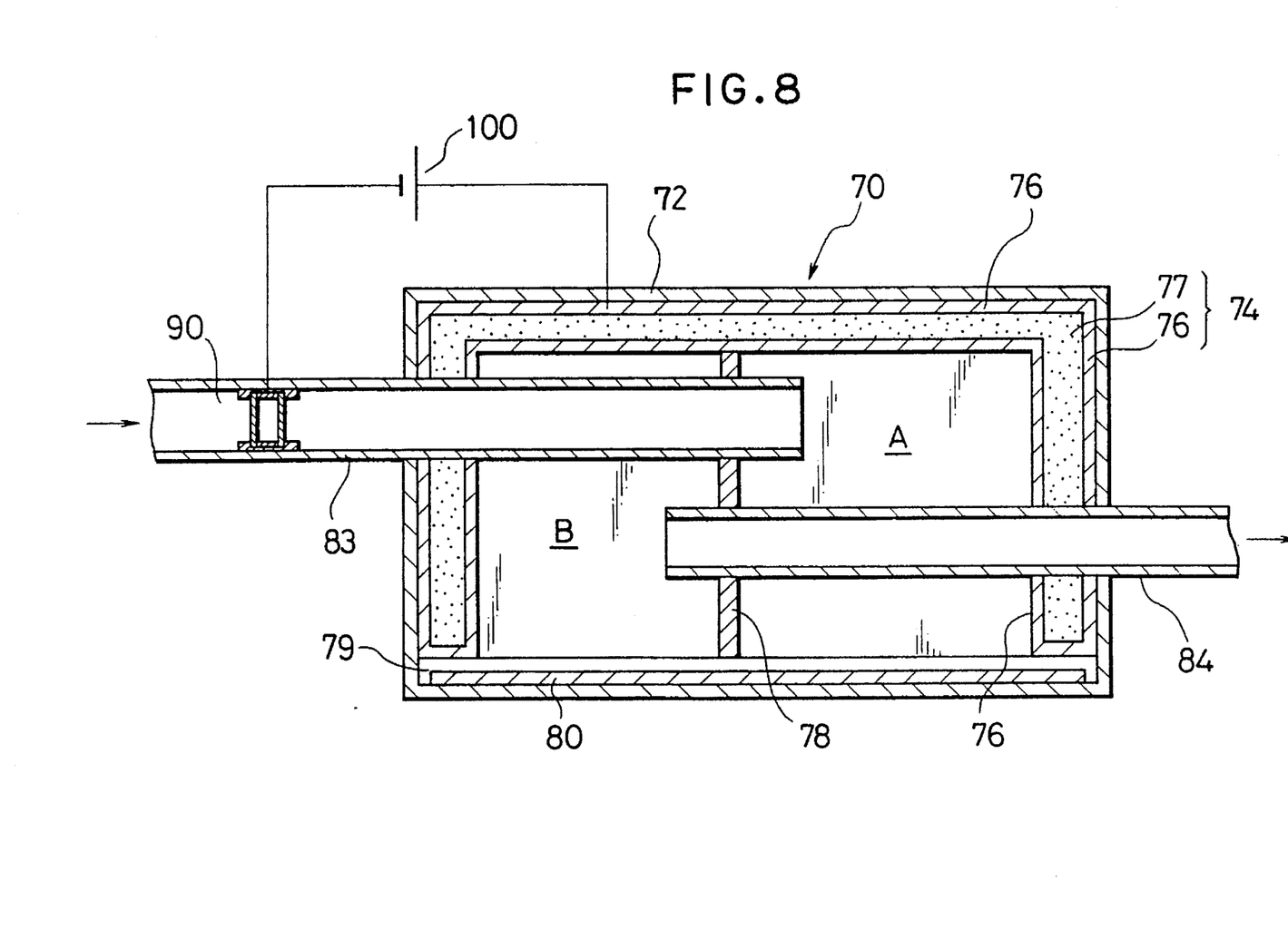
FIG. 8 is a longitudinal sectional view showing another embodiment of a muffling and denitrating apparatus according to the present invention which is equipped with a dust collecting mechanism.
Figure 9:
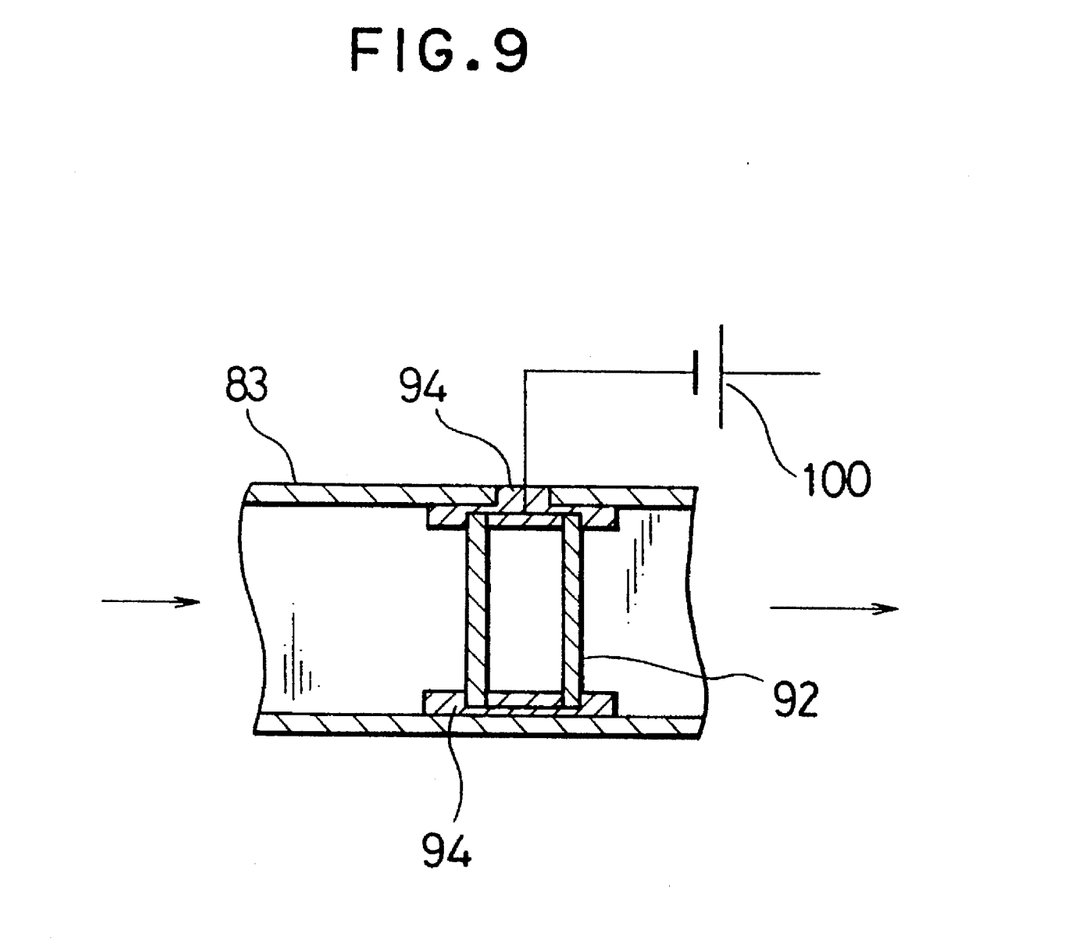
FIG. 9 is a fragmentary sectional view showing an essential part of the muffling and denitrating apparatus showing FIG. 8.

Referring now to FIGS. 8 and 9, another embodiment of a muffling and denitrating apparatus according to the present invention is illustrated, which is equipped with a dust collecting mechanism. A muffling and denitrating apparatus of the illustrated embodiment which is generally designated at reference numeral 70 is constructed in substantially the same manner as the muffling and denitrating apparatus 1 of FIG. 2 described above, except that it is equipped with the dust collecting mechanism. The dust collecting mechanism incorporated in the apparatus 70 includes an electrifying mesh section 90 and a dust collecting filter section 74.

The electrifying mesh section 90 is made of a conductive perforated material 92 such as a stainless steel wire net material of, for example, 40 to 500 meshes and is arranged, through an insulating member 94, at a desired position in a exhaust gas inlet pipe 83 acting as an exhaust gas discharge path. Also, the electrifying mesh section 90 is electrically connected to a negative electrode of a DC power supply 100. In FIG. 8, the muffling and denitrating apparatus 70 further includes a rectifying plate 78, heating means 80 and an exhaust outlet pipe 84.

The dust collecting filter section 74 includes a conductive perforated material 76 and a carbon fiber or particle layer 77 covered by the perforated material 76. The dust collecting filter section 74 is positioned on a downstream side in the exhaust gas discharge path based on the electrifying mesh section 90. Also, the dust collecting filter section 74 is electrically connected to a positive electrode of the DC power supply 100. Similarly, in the first embodiment of the muffling and denitrating apparatus shown in FIG. 2, by providing an electrifying mesh section to be coupled with the positive electrode of a DC power supply in the exhaust gas inlet pipe 13 and by electrically connecting the muffling and denitrating section 4 to the negative electrode of the DC power supply, the muffling and denitrating section 4 can further function as a dust collecting filter section.

The remaining part of the illustrated embodiment may be constructed in substantially the same manner as the first embodiment described above.

Now, the manner of operation of the muffling and denitrating apparatus 70 equipped with the dust collecting mechanism will be described hereinafter with reference to FIGS. 8 and 9.

Exhaust gas is fed from a combustion engine through the exhaust gas inlet pipe 83 to the muffling and denitrating apparatus 70, so that particulates such as soot in the exhaust gas are electrostatically negatively charged in the electrifying mesh section 90. The exhaust gas containing the particulates thus negatively charged is fed to a space section A in a body 72 of the apparatus 70, in which it is contacted with the dust collecting filter section 74. This causes the charged particulates to be electrically adsorbed on the filter section 74 by coulombic force. It is a matter of course that the above-described muffling and denitrating operation is carried out concurrent with removal of the particulates. The adsorbed particulates are readily separated from the dust collecting filter section 74 and dropped into a soot reservoir 79 when the power supply is turned off and shock is applied to the filter section 74.

Test Example 4

6 g of carbon particles (particle diameter: 0.1 to 1 mm, average surface area: 0.2 m²/g) made of activated coke was placed in a closed vessel and nitrogen monoxide (99.9%) at a temperature of 350° C. was flowed into the vessel at a flow rate of 200 ml/min for 12 hours to subject the carbon particles to modification. The carbon particles thus modified had an average surface area of 600 to 2000 m²/g.

The modified carbon particles were used in a denitrating test. Likewise, the activated coke carbon particles used for preparing the modified carbon particles were used for comparison in the test. 6 g of the modified carbon particles and 6 g of the activated coke carbon particles were filled in two glass tubes of 7 mm in diameter and open at both ends, respectively. After the charging, the glass tubes each were closed at both ends thereof with a wire net material in order to prevent scattering of the particles. Then, nitrogen monoxide gas (99.9%) at a temperature of 300° C. was continuously flowed through one end of each of the glass tubes thereinto at a flow rate of 200 ml/min for 8 hours, during which a concentration of NOx was determined at an interval of every one hour and concurrently a concentration of $N_2$, $CO_2$ and CO was measured. The results were as shown in FIG. 10.

Figure 10:
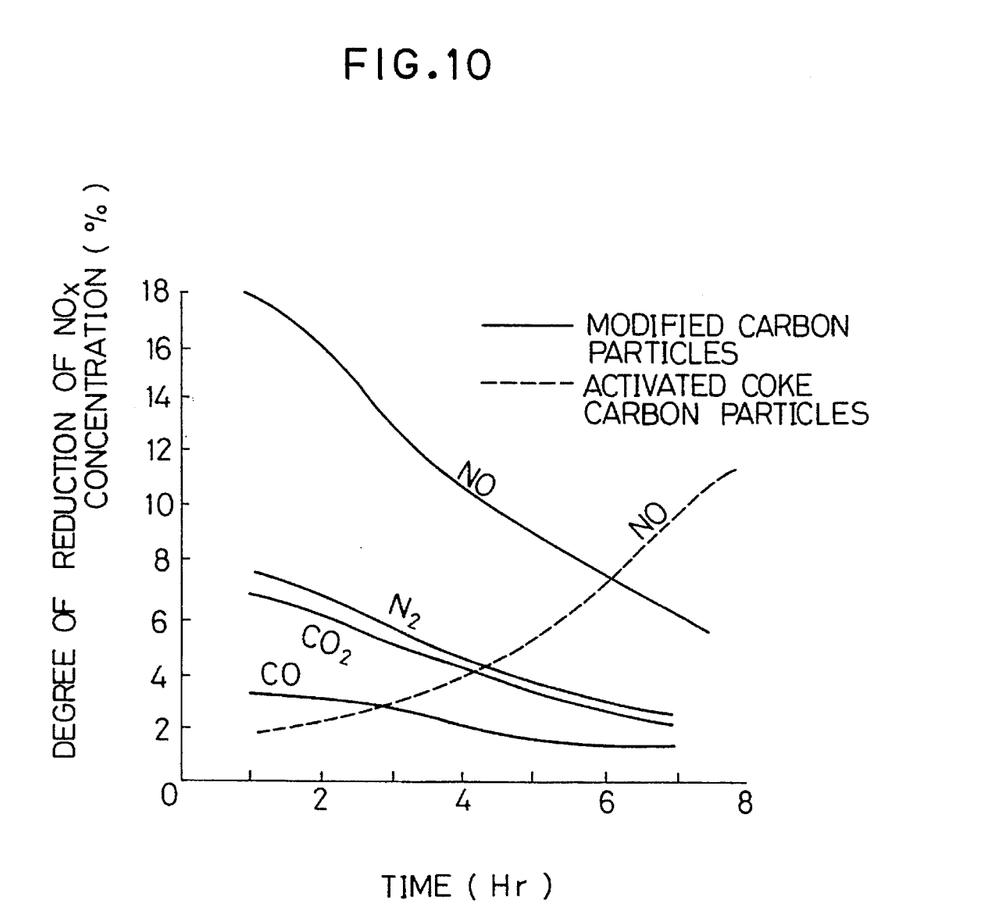
FIG. 10 is a graphical representation showing results of a denitrating test carried out using modified carbon particles.

As can be seen from FIG. 10, the modified carbon particles exhibited excellent denitrating performance continuously from an initial stage of the test as compared with the activated coke carbon particles. Also, the modified carbon particles permitted a degree of reducing an NOx concentration to be increased. This was also proved by a concentration of each of $N_2$, $CO_2$ and CO. It would seem that the modified carbon particles were deteriorated in denitrating performance with time. However, this is due to the fact that the modified carbon particles were gradually consumed in the course of production of $N_2$, $CO_2$ and CO, resulting in being decreased in quantity or surface area. Thus, it will be understood that the modified carbon particles were not deteriorated in denitrating performance.

Test Example 5

6 g of carbon fibers (fiber diameter: 14 μm, average surface area: 0.2 m²/g) made of coal pitch was placed in a closed vessel and immersed in nitric acid (63.01%) at a room temperature for about 2 hours. Then, the carbon fibers were washed with water until a pH thereof reaches about 7 and then dried at a temperature of about 130° C., resulting in modified carbon fibers being prepared. The carbon fibers thus modified had an average surface area of 600 to 2000 m²/g.

The modified carbon fibers were used for a denitrating test, which was carried out in substantially the same procedure as Test Example 4 described above. For comparison, the coal pitch carbon fibers were used in the denitrating test. The results were as shown in FIG. 11.

Figure 11:
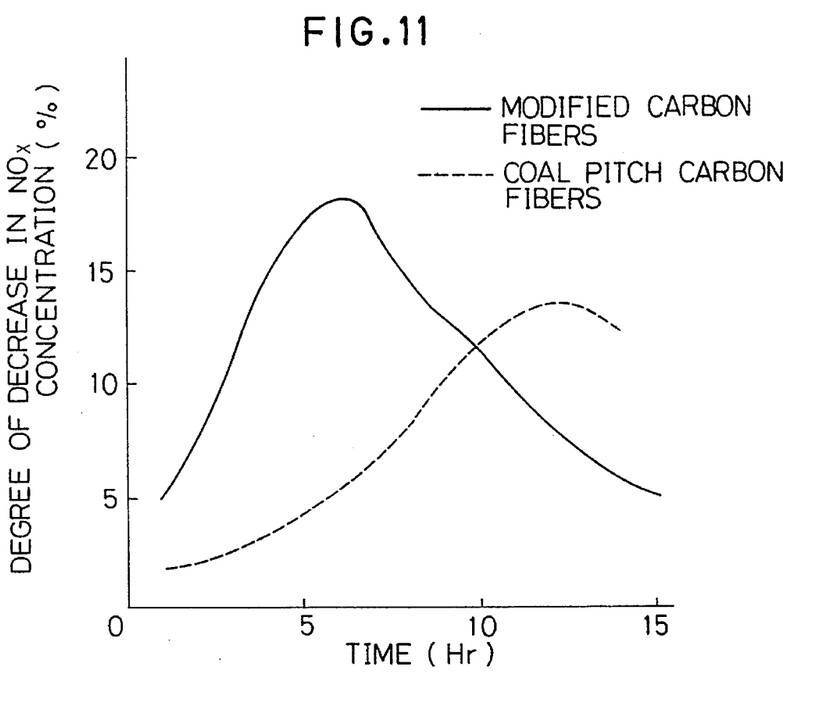
FIGS. 11 and 12 each are a graphical representation showing results of a denitrating test carried out using modified carbon fibers.

As will be apparent from FIG. 11, the modified carbon fibers exhibited excellent denitrating performance continuously from an initial stage of the test as compared with the coal pitch carbon fibers. Also, the modified carbon fibers permitted a degree of reducing an NOx concentration to be significantly increased and an amount of time integration (area %×h) of NOx to be increased. Likewise, it would seem that the modified carbon fibers were deteriorated in denitrating performance with time. The reason is as described above in Test Example 4.

Test Example 6

Carbon fibers were treated in substantially the same manner as Test Example 5 except that nitric acid, sulfuric acid, hydrochloric acid and ammonia were used and a temperature was set at 60° C. 6 g of the carbon fibers treated each of the reagents and 6 g of untreated carbon fibers were used in a denitrating test, which was carried out in substantially the same procedure as Test Example 4 described above. The results of a degree of denitration were that modified carbon fibers treated with nitric acid was 17.5%, carbon fibers treated with sulfuric acid was 12.2%, carbon fibers treated with hydrochloric acid was 1.0%, carbon fibers treated with ammonia was 6.8% and untreated carbon fibers was 14.0%. The degree of denitration indicated was a maximum value.

Test Example 7

The modified carbon fibers and coal pitch carbon fibers described in Test Example 5 each were placed in a vessel, which was then arranged at an intermediate position in an exhaust gas pipe of a four-cycle water-cooled four-cylinder engine (displacement: 1171 ml) for measuring a degree of denitration. The results were as shown in FIG. 12.

Figure 12:
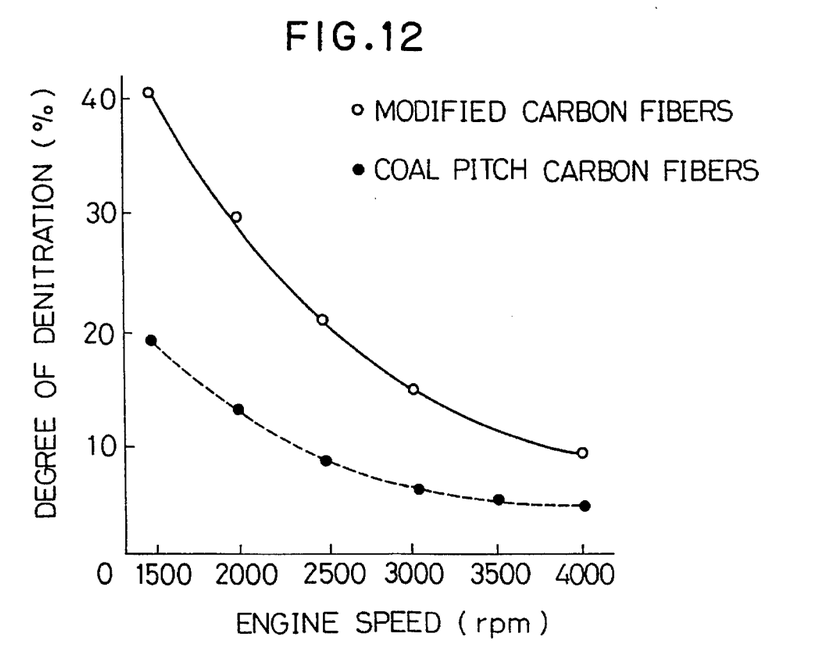

As will be noted from FIG. 12, the modified carbon fibers exhibited a degree of denitration twice as large as the coal pitch carbon fibers.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A muffling and denitrating apparatus for coupling to exhaust gas inlet and outlet pipes through which exhaust gas flows, comprising:

a substantially cylindrical body formed of a hollow vessel, said body having first and second opposed ends;

a muffling and denitrating section arranged in said body and including a cover member and a carbon layer containing at least one of carbon fibers and carbon particles and retained in said cover member, said cover member being made of a perforated material and extending circumferentially to cover substantially an entire cylindrical circumference of said body other than a lower portion thereof and also covering substantially the entire first and second ends of said body;

a soot reservoir section arranged at said lower portion of said body for collecting soot;

heating means arranged in said soot reservoir section;

at least one rectifying plate arranged in said body and formed with a plurality of through-holes, said at least one rectifying plate dividing a space in said body defined by said cover member and said soot reservoir section into a first space section and a second space section;

an exhaust gas inlet pipe extending through a first one of said through-holes in said at least one rectifying plate and connecting only into said first space section, and an exhaust gas outlet pipe extending through a second one of said through-holes in said at least one rectifying plate and connecting only into said second space section.

2. A muffling and denitrating apparatus as defined in claim 1, wherein said perforated material, for said cover member is selected from the group consisting of a wire net material and a punched metal material.

3. A muffling and denitrating apparatus as defined in claim 2, wherein said wire net material and punched metal material are formed into 40 to 500 meshes.

4. A muffling and denitrating apparatus as defined in claim 1, wherein the carbon layer contains carbon fibers having a fiber diameter of 0.5 to 15 μm.

5. A muffling and denitrating apparatus as defined in claim 1, wherein the carbon layer contains carbon particles formed into a substantially spherical shape having a particle diameter of 0.01 to 2 mm.

6. A muffling and denitrating apparatus as defined in claim 1, further comprising an electrifying mesh section which is made of a conductive perforated material and is arranged in the exhaust gas inlet pipe, wherein the electrifying mesh section is electrically connected to a negative electrode of a DC power supply and the muffling and denitrating section is electrically connected to a positive electrode of the DC power supply so as to function as dust collecting means.

7. A muffling and denitrating apparatus as defined in claim 6, wherein the carbon layer has an average surface area of 80 to 2000 $m^2/g$.

8. A muffling and denitrating apparatus as defined in claim 1, wherein the carbon layer has an average surface area of 80 to 2000 $m^2/g$.

9. A muffling and denitrating apparatus as defined in claim 1, wherein the carbon layer contains carbon particles, further comprising at least one carbon particle feed section for storing carbon particles, said at least one feed section being coupled to said carbon layer such that carbon particles are fed therefrom into said carbon layer.

10. A muffling and denitrating apparatus as defined in claim 9, wherein the carbon layer has an average surface area of 80 to 2000 $m^2/g$.

11. A muffling and denitrating apparatus as defined in claim 1, wherein said carbon layer contains carbon particles and wherein said cover member is divided into separated portions, further comprising means for independently feeding carbon particles into said carbon layer of said separated portions of said cover member.

* * * * *